United States Patent [19]

Frichmann et al.

[11] Patent Number: 4,518,290

[45] Date of Patent: May 21, 1985

[54] ANCHORING BOLT

[75] Inventors: Albert Frichmann, Teningen; Danilo Sternisa, Emmendingen; Kurt Mermi, Teningen; Herbert Kistner, Freiburg-Betzenhausen, all of Fed. Rep. of Germany

[73] Assignee: Upat GmbH & Co., Emmendingen, Fed. Rep. of Germany

[21] Appl. No.: 474,594

[22] PCT Filed: Jun. 12, 1982

[86] PCT No.: PCT/DE82/00127

§ 371 Date: Feb. 22, 1983

§ 102(e) Date: Feb. 22, 1983

[87] PCT Pub. No.: WO82/04461

PCT Pub. Date: Dec. 23, 1982

[30] Foreign Application Priority Data

Jun. 19, 1981 [DE] Fed. Rep. of Germany ....... 3124244
Oct. 2, 1981 [DE] Fed. Rep. of Germany ....... 3139174

[51] Int. Cl.³ .............................................. F16B 13/08
[52] U.S. Cl. ........................................ 411/30; 411/77; 411/82; 405/261
[58] Field of Search .................................... 411/29–31, 411/50–53, 54, 57, 60, 55, 75–80, 82; 405/259–261

[56] References Cited

U.S. PATENT DOCUMENTS

| 948,938 | 2/1910 | Skidmore | 411/55 |
| 1,762,349 | 6/1930 | Phillips | 411/31 |
| 2,570,618 | 10/1951 | Werner | 411/57 |
| 3,202,035 | 8/1965 | Rosselet | 411/31 |
| 4,073,212 | 2/1978 | Lerich | 411/54 |
| 4,091,882 | 5/1978 | Hashimoto | 411/30 |
| 4,162,133 | 7/1979 | Clark et al. | 405/259 |

FOREIGN PATENT DOCUMENTS 35095 9/1981 European Pat. Off. ............ 411/57

Primary Examiner—Thomas J. Holko
Assistant Examiner—Neill Wilson
Attorney, Agent, or Firm—Frishauf, Holtz, Goodman & Woodward

[57] ABSTRACT

In order to produce conical undercutting of the bore when the anchoring bolt is driven into a previously bored hole with a percussion drill, the insertion end of the bolt has a slot into which the thin end of a wedge is inserted. Hard metal pegs set in radial bores near the insertion end of the bolt at diametrically opposite places on the periphery of the bolt protrude slightly and, as the bolt is driven into place, the wedge spreads its insertion end and causes the hard metal pegs to undercut the walls of the bore more and more as the bolt is set in place. A conical undercutting of the bar thus results.

16 Claims, 8 Drawing Figures

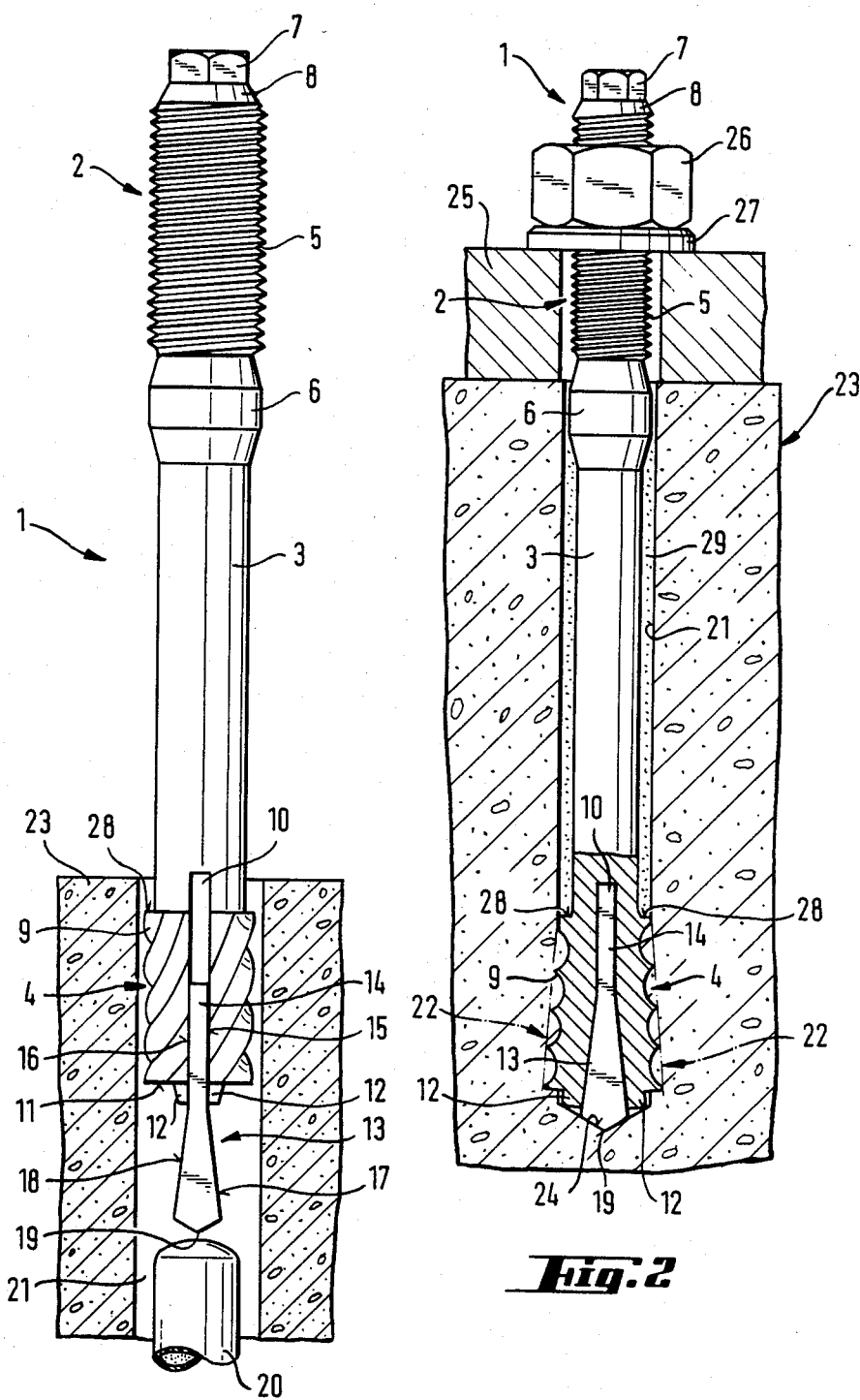

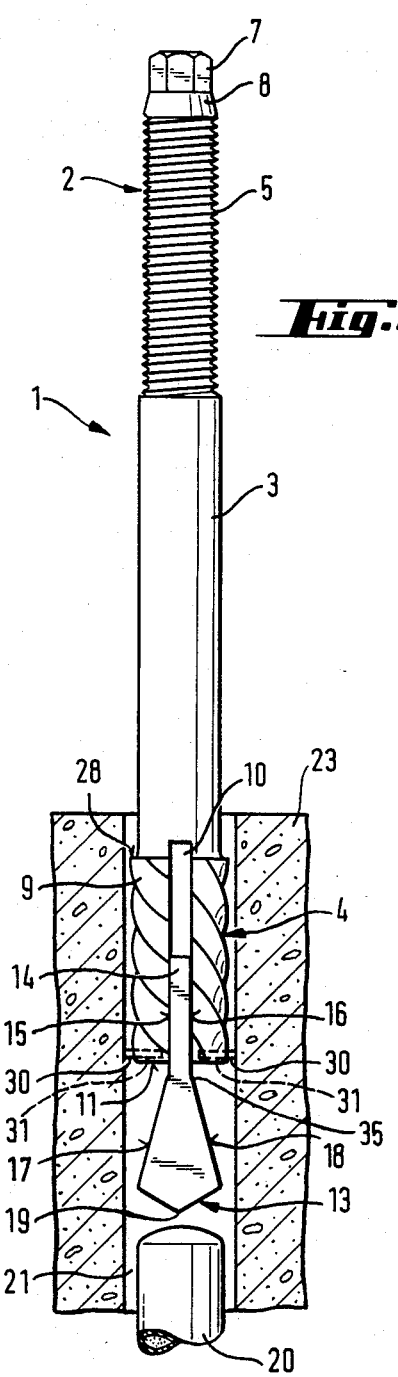
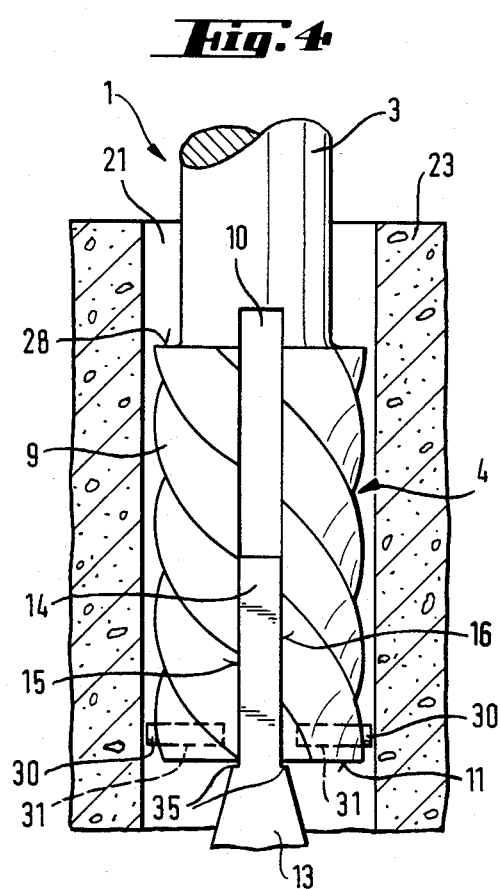

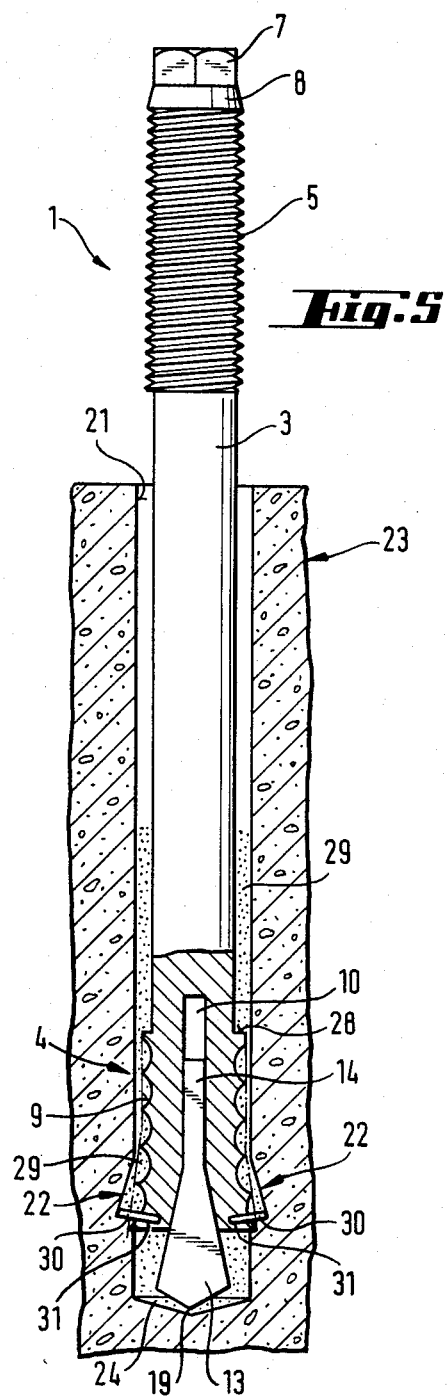
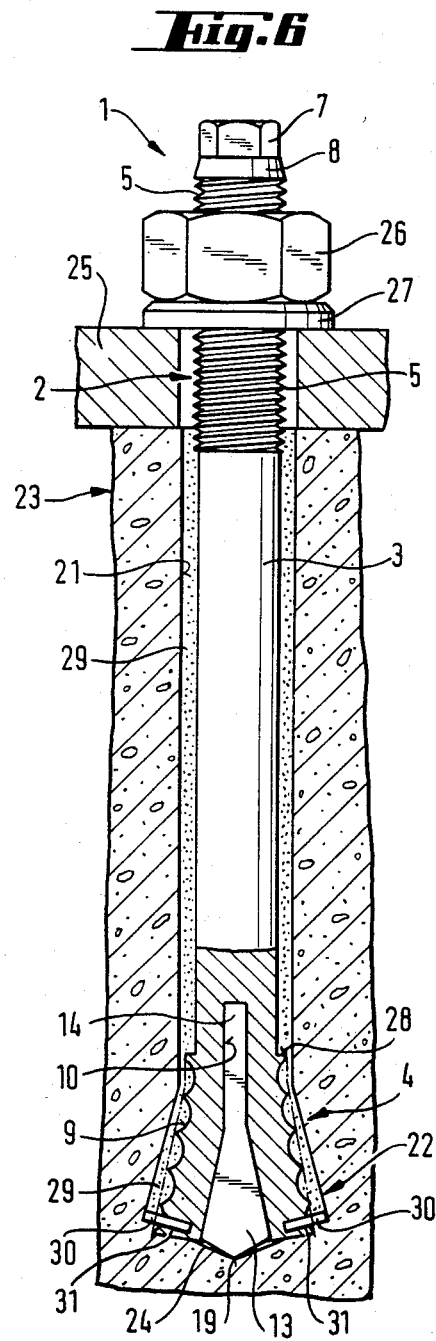

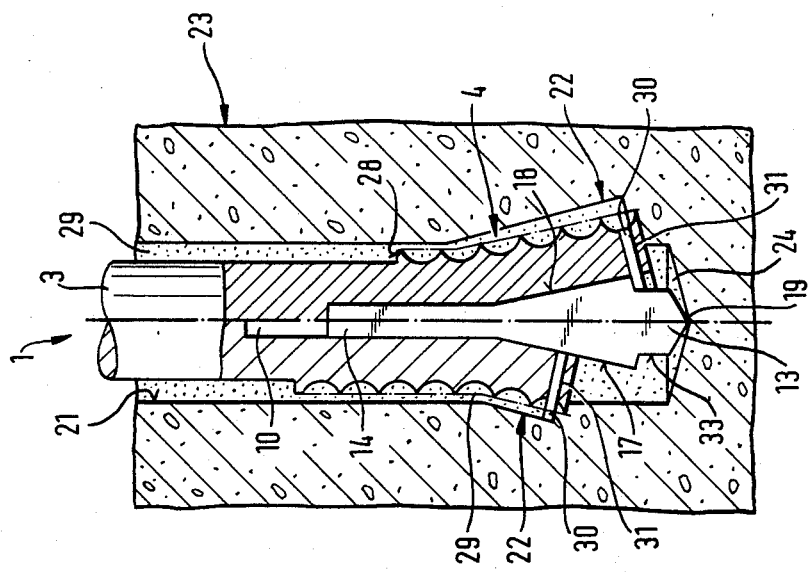
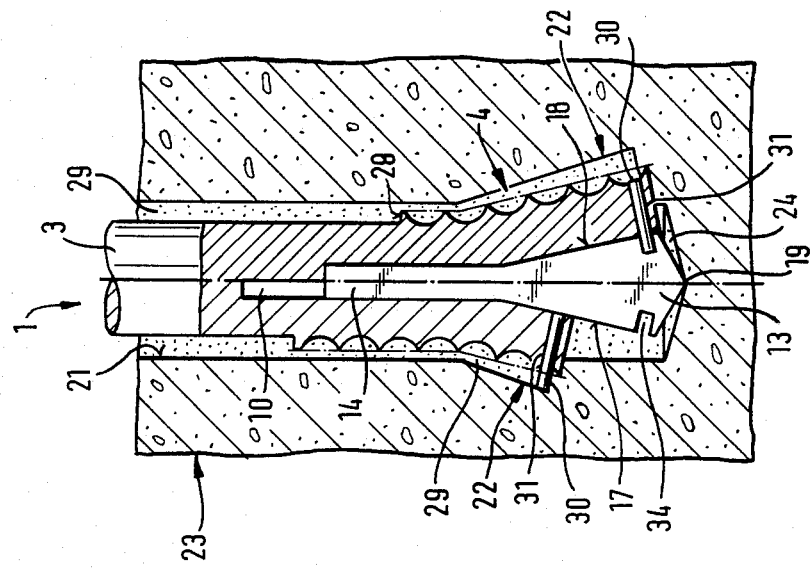

ANCHORING BOLT

The invention concerns an anchoring bolt with a connection portion, a smooth rod section and an insertion portion, by which it is possible to produce conical undercutting in a cylindrical pre-bore which is filled with a mortar capsule, when the anchoring bolt is drilled into the bore.

BACKGROUND AND PRIOR ART

An anchoring bolt of that kind is described in DE-OS No. 29 41 769. The conical undercutting is produced in the case of the known anchoring bolt by the cooperation of rod profiling and the presence of abrasive grains in the mortar capsule. The anchoring bolt executes a staggering motion in which the insertion end, with its profiling, is moved in a more or less defined path. The abrasive grains of the mortar capsule, in the case of the known anchoring bolt, are pulled along intermittently with a component of motion in the circumferential direction during the drilling-in movement and, as a result of their being alongside the insertion portion, they are forced along the walls of the cylindrical pre-bore. The exact shape of the undercutting results as a matter of chance and it is not excluded that a cross-section through the undercutting is oval instead of round.

If the known anchoring bolt should be used for anchoring in a so-called parting zone, a defined undercutting is desirable. In particular it is advantageous of the undercut has circular symmetry, since it cannot be foreseen in which direction the cracks that may possibly appear will run.

SUMMARY OF THE INVENTION

Starting from the above-described state of the art, the invention has the object of providing an anchoring bolt of the kind mentioned in the introduction by which it is possible to provide a defined and reproducible widening without the introduction of abrasive grains.

This object is accomplished according to the invention by having the anchoring bolt provided, in the region of the insertion portion, with a slot, running axially from the insertion end, into which there projects the narrowed-down end stem of an axially shiftable spreading wedge. In the setting operation the wedge first breaks the resin mortar capsule located in the bore hole and then finally reaches the bottom of the bore. Under hammer-driling movement and continuous axial pressure, the insertion end is then pushed over the wedge standing up in the bore. The insertion portion of the anchoring bolt is hereby pressed against the bore walls and widened. The wedge is driven into the slot until its stem abuts the closed slot end. When this point is reached, the anchor rod has reached its greatest possible spreading and the intended undercut is produced.

The removal of the bore material is performed either by profiling formed on the insertion portion of the rod or by inserts provided in the insertion portion which are disposed radially protruding beyond its circumference.

It is useful for the wedge to have an extension in the form of a stem with parallel running surfaces, so that the wedge can be clamped in the slot and the user receives the anchor bolt and the wedge as a set. It is advantageous for the slot to extend through the profiling all the way into the smooth shaft section and for the width of the wedge to be somewhat smaller than the outer diameter of the profiling. The optimum size of the wedge angle for the wedge depends upon the hardness of the fastening ground, the material quality of the anchoring bolt and the length of the wedge. A favorable wedge angle for a fastening ground of concrete lies in the region from 2° to 6°. Good crushing of the mortar capsule and mixing up of the synthetic resin mortar is obtained when the wedge has an obtuse point at its outward end and the anchoring bolt is provided at its end surface with mixing teeth.

In one example of embodiment of the invention the inserts are constituted as round hard metal pegs, which are soldered, cemented or pressed into radially extending socket bores. In order to prevent pulling the insertion portion of the anchoring bolt, once it becomes fixed in the bore, away from the wedge, it is advantageous for the socket bores to extend radially all the way through to the slot and for the hard metal pegs to be guided and radially shiftable therein. After the greatest possible spreading has been reached, the hard metal pegs slip into cavities which are provided at the forward end of the wedge surfaces of the wedge. By the instrusion of the inwardly lying ends of the hard metal pegs the withdrawing of the anchoring bolt from the wedge is effectively prevented. The cavities can have the configuration of shoulders or of grooves running perpendicularly to the wedge surfaces.

The use of the anchoring bolt according to the invention also has the advantage of dispensing with the provision of additional materials in the mortar capsule that is to be used, since the excavated material is usable as additional material.

It is of particular advantage that the anchoring bolt is at the same time a fastening means and a widening tool for obtaining undercutting in the deepest part of a cylindrical bore hole, since in consequence the anchor bolt does not have to be removed from the bore after completing the undercut.

BRIEF DESCRIPTION OF THE DRAWINGS

Embodiment examples of the subject matter of the invention are illustrated in the drawings, in which:

FIG. 1 shows a first embodiment example of the anchoring bolt of the invention in the region of the mouth of a bore, in a side view;

FIG. 2 shows the anchoring bolt according to FIG. 1 in inserted condition, in a side view partly in section;

FIG. 3 shows a further embodiment example of the anchoring bolt according to the invention in the region of the mouth of a bore before the crushing of the mortar capsule, in a side view, the mortar capsule partly in section;

FIG. 4 shows the insertion portion of the anchoring bolt according to FIG. 3, in an enlarged side view;

FIG. 5 shows the anchoring bolt according to FIG. 3 in an intermediate stage of insertion in a bore, in a side view partly in section;

FIG. 6 shows the anchoring bolt according to FIG. 3 in inserted condition, in a side view, partly in section;

FIG. 7 shows the insertion portion of another embodiment example of the anchoring bolt according to the invention, in partial section and partly in a side view, with an intermediate stage being shown at the left, and a final stage at the right, of the performance of the undercut, and FIG. 8 shows a further embodiment example of the anchoring bolt according to the invention in a representation corresponding to FIG. 7.

DESCRIPTION OF THE PREFERRED EMBODIMENTS

The anchoring bolt designated as a whole by 1 consists essentially of a connection portion 2, a smooth shaft section 3 and an insertion portion 4. The connection portion 2 has external threading 5 that goes over into an intermediate connection 6. At the end of the threading 5 opposite the intermediate connection 6 there is provided a tappet element 7 extending upwards axially above the connection part 2. The tappet is constituted as a hexagonal stud in the nature of a screw head and is provided with a transition 8 that has an inclination preventing shearing effects.

At the insertion end of the anchoring bolt 1 the insertion portion 4 is provided with profiling 9 that is visible in FIG. 1 and forms a shoulder 28 where it terminates at the smooth shaft end. This profiling 9 can be constituted in sawtooth, trapezoidal or pointed shape. The outer diameter of the profiling 9 corresponds to the nominal thread diameter of the external threading 5, so that the anchoring bolt can have an insertion type mounting.

As is readily recognizable in FIG. 1, the anchoring bolt 1 has a slot 10 that extends from the front end of the anchoring bolt 1, proceeding axially and centrally through the insertion portion 4 to the smooth shaft section 3. The slot 10 is constituted as a cavity that extends diametrally somewhat to each side as it penetrates through the insertion portion 4. The profiling 9 extends at least over ⅔ of the length of the slot 10.

The end surface 11 of the insertion portion 4 extends essentially at right angles to the longitudinal axis of the anchoring bolt 1, and is equipped with mixing teeth 12. A spreading wedge 13 projects with its extension stem 14 past the mixing teeth 12 into the slot 10. The stem 14 has a thickness that is equal to the slot width. The stem 14 has two surfaces 15 and 16 which run parallel to each other and lie against the lateral edges of the slot 10.

There is shown in FIG. 1 how the wedge 13 can be clamped in the slot 10 so that the user can receive the anchor bolt 1 and the spreading wedge 13 as a complementary set. The clamping can be obtained by precise fitting of the thickness of the stem 14 to the clearance of the slot 10 or instead by pressing the wedge 13 with its wedge surfaces 17 and 18 a little into the slot 10.

The wedge surfaces 17 and 18 of the wedge 13 form a wedge angle that, for example, for a fastening ground of concrete, amounts to 2° to 6°. The wedge surfaces 17 and 18 terminate, at the end opposite to the stem 14, in a wide-angle point 19 that primarily has the task of shattering the glass container of a synthetic resin mortar capsule 20 and providing a good mixing up of the mortar mass. Furthermore, a reduction of friction forces is obtained by the obtuse point 19 when the wedge 13 is seated on the bottom of the bore 21 represented in FIG. 1. The width of the wedge 13 is somewhat less than the outer diameter of the profiling 9.

The anchor rod 1 is made of hardenable steel and may be hardened completey through or have a hard surface and a tough elastic core. Starting materials that come into consideration for the wedge 13 are preferably case-hardened or through-hardened steel, but also hard metal or ceramics.

The overall length of the wedge 13 corresponds to the length of the slot 10. For reducing the friction forces between the stem 14 of the wedge 13 and the walls of the slot 10, the wedge 13 or the slot 10 can also be coated with a lubricant.

Whereas FIG. 1 shows the beginning of the insertion procedure for the anchoring bolt 1 in a bore 21, FIG. 2 shows the anchoring bolt after setting in place. It is plainly recognizable in FIG. 2 that the anchoring bolt 1 serves at the same time as fastening means and as widening tool for obtaining an undercut 22 in the deepest part of the cylindrical bore 21.

In preparation for a setting operation the cylindrical bore 21 is first drilled in a fastening ground 23. Thereafter a synthetic resin mortar capsule 20 is pushed into the bore 21. Finally the anchoring bolt, together with the wedge 13 clamped in the slot 10, is introduced into the bore 21 with percussion-drilling movement and continuous axial pressure, while the mortar capsule 20 is shattered and its contents mixed up. As soon as the blunt point of the broad bottom of the wedge 13 has reached the bore bottom 24, the insertion portion 4 of the anchoring bolt 1 is pushed over the wedge 13 standing up in the bore. The profiling 9 of the anchoring bolt 1 is thereby pressed against the walls of the bore 21 and the bore is widened corresponding to the amount of the material removed. The spreading wedge 13 is driven so far into the slot 10 that the stem 14 lies against the closed end of the slot 10. When this state is reached, the anchoring rod 1 has reached its largest possible spreading, has produced the intended undercut 22 and has formed an interlocked connection with the ground. The bonding, i.e. the mortar mass 29, is supported by the shoulder 28 which provides a small initial slip.

As is further recognizable in FIG. 2, an insertion type assembly is possible. The object 25 to be fastened is pressed against the surface of the fastening ground 23 with the help of a nut 26 and a washer 27.

The profiling 9 of the insertion portion 4 can, as mentioned, be constituted by sawtooth, trapezoidal or pointed shape or could also in the case of another illustrative example not shown in the drawings be entirely omitted if as described below hard metal pegs 30, ceramic rods or other suitable inserts are used, in which case, if an insertion assembly is desired, the outer diameter of the smooth insertion portion is smaller than the nominal thread diameter of the external threading 5.

In the embodiment example shown in FIGS. 3 to 6 and especially in FIG. 4 the insertion portion 4 at its outer end has two radial blind bores 31 extending at right angles to the slot 10 in which hard metal pegs 30 are set. The profile of the hard metal pegs 30 is preferably round but can have any desired contour. As the material for the pegs 30 hard metal, ceramic or hardened steel is used. The fastening of the hard metal pegs 30 into the blind bores 31 is performed by soldering, cementing or press-fitting. The diameter of the hard metal pegs 30 is made suitable to the outer diameter of the anchor bolt 1, with the hard metal pegs 30 protruding radially beyond the circumference of the insertion portion 4 or of the profiling 9.

In the case of smooth and cylindrically-shaped insertion ends the hard metal pegs 30 alone perform the material removal for producing an undercut 22. If no hard metal pegs are present, the profiling 9 takes over this assignment as above explained. If, as shown in the embodiment example according to FIGS. 3 to 8, both the profiling 9 and also the hard metal pegs 30 are provided, the profiling 9 provides support for the mixing together of the mortar mass 29.

While FIG. 3. shows the beginning of the setting of the anchoring bolt 1 in a bore 21, FIG. 5 shows the anchoring bolt 1 during the setting operation and FIG.

6 the anchoring bolt 1 after termination of the setting operation. As is evident from FIGS. 5 and 6, the anchoring bolt 1 of the second embodiment example is at the same time fastening means and widening tool for obtaining an undercut 22 in the deepest part of the cylindrical bore 21.

The setting operation corresponds essentially to the setting operation described above for the anchoring bolt 1 according to FIG. 1. In order to prevent a premature spreading of the insertion portion 4 in the shattering of the mortar capsule 20, shoulders 35 are formed on the stem 14 of the wedge 13 in the embodiment example according to FIGS. 3 and 4. As soon as the point of the wedge 13 has reached the bottom 24 of the bore, the insertion portion 4 is pushed fully over the wedge 13 and standing up in the bore 21. At this time, according to the construction of the insertion portion 4, the profiling 9 and/or the hard metal pegs 30 of the anchoring bolt 1 are pressed against the wall of the bore 21 and produce a widening corresponding to the magnitude of the material removal. In the course of the provision of the undercut 22 the wedge 13 is driven so far into the slot 10 that the stem 14 abuts against the closed end of the slot 10, as shown in FIG. 6. Upon reaching this state the anchoring bolt 1 has reached its greatest possible spreading, by which intended undercut 22 is produced and a shape-locked connection is made.

An insertion type assembly is performed also in the case of the embodiment example shown in FIG. 6. The object 25 to be fastened, as in the case of the first embodiment example, is pressed against the surface of the fastening ground 23 with the assistance of a nut 26 and a washer 27.

FIGS. 7 and 8 show two further embodiment examples of the anchoring bolt 1, in which instead of the blind bores 31 (FIG. 4) socket bore passages 32 are provided at the front end of the insertion portion 4. The hard metal pegs 30, in contrast to the embodiment example shown in FIGS. 3 to 6, are prolonged and can slide in the passage-type socket bores 32. During the widening operation they lie against the wedge surfaces 17 and 18 of the wedge 13 and after the greatest possible spreading is reached they drop back respectively into cavities provided for the purpose in the region of the obtuse point 19 of the wedge 13.

In the embodiment example shown in FIG. 7 the cavities are constituted in the form of shoulders 33. In the embodiment example according to FIG. 8, instead of the shoulders, grooves 34 are provided that extend perpendicularly to the longitudinal axis of the wedge surfaces 17 and 18 of the wedge 13 and have a width that is sufficient for catching the inwardly located end of the hard metal pegs 30.

By these precautions it is prevented that the insertion portion 4 of the anchor bolt 1 already anchored in the bore could be pulled away from the wedge 13. In the case of an axial pull in the wedge direction of the wedge 13 a carrying along of the wedge 13 is assured by means of the hard metal pegs 30 caught in the shoulders 33 or the grooves 34, so that it is not possible to pull the widened insertion portion 4 away from the wedge 13 and to press it together by the bore that becomes narrower in the direction of pull.

The preferred field of application of the anchoring bolt 1 is anchoring in a so-called partition zone. The direction in which cracks run in a fastening ground is not calculable and there is accordingly the danger that such cracks will run transversely through a fastening bore and increase the diameter of the latter. In the case of the anchoring bolt 1 according to the invention, as the result of the undercutting or grasping around in the deepest part of the bore, there is still sufficient residual holding force present to prevent the anchoring bolt 1 from falling out of the bore 21 in spite of a possible loosening, when a crack runs directly through the bore 21.

We claim:

1. Anchoring bolt having a smooth shaft portion (3) interposed between and integral with a connection portion (2) and an insertion portion (4) for insertion, by drilling, into a cylindrical bore (21) and for conically undercutting the walls of said bore after insertion, said insertion portion extending to an end of the bolt and having, in accordance with the invention:

at least two diametrically opposite inserts (30) set in radially running bores (13,32) of said insertion portion of said bolt near said end of said bolt and of said insertion portion, said inserts protruding beyond the periphery of said insertion portion of said bolt;

a diametrical slot (10) extending axially into said insertion portion of said bolt from said end thereof at the end of said bolt, and an axially displaceable elongated spreading wedge (13) having a tapered-down end inserted in said slot of said insertion portion of said bolt and having a width that does not exceed the outer diameter of said insertion portion of said bolt.

2. Anchoring bolt according to claim 1, wherein said spreading wedge (13) has a stem (14) at said tapered-down end of said wedge, said stem having a uniform thickness, between parallel running surfaces (15, 16), which thickness is equal to width of said slot.

3. Anchoring bolt according to claim 1, wherein the width of said spreading wedge (13) is narrower than the outer diameter of said insertion portion (4) of said bolt.

4. Anchoring bolt according to claim 1, wherein said wedge (13) has a wide-angled point (19) at its thickest end, which end and point are directed away from the insertion portion (4) of said bolt when said wedge is inserted in said slot.

5. Anchoring bolt according to said external claim 2, wherein the overall length of said spreading wedge (13) and said stem (14) thereof corresponds to the length of the slot (10).

6. Anchoring bolt according to claim 1, wherein said insertion portion (4) of said bolt has a external profiling (9) which forms a shoulder (28) at its junction with said smooth shaft portion.

7. Anchoring bolt according to claim 6, characterized in that the length of said external profiling (9) amounts to at least ⅔ of the length of said slot (10).

8. Anchoring bolt according to claim 1, wherein said inserts (30) are hard metal pegs of round profile.

9. Anchoring bolt according to claim 8, wherein said bores are blind bores (31) in each of which a hard metal peg (30) is fastened.

10. Anchoring bolt according to claim 8, wherein said bores (32) extend radially right through to said slot (10) and said hard metal pegs (30) are guided and radially shiftable therein.

11. Anchoring bolt according to claim 10, wherein said spreading wedge (13) has a cavity (33, 34) at the forward end of each of the wedge surfaces (17, 18), each said cavity having a width at least equal to the diameter of said hard metal pegs (30).

12. Anchoring bolt according to claim 11, wherein said cavities (33, 34) have lateral contours which form a right angle with wedging surfaces (17, 18) of said wedge (13).

13. Anchoring bolt according to claim 12, wherein said cavities are shoulders (33) at the front end of the spreading wedge (13).

14. Anchoring bolt according to claim 12, wherein said cavities are in each case grooves (34) running transverse to the wedge surfaces (17, 18).

15. Anchoring bolt according to claim 1, wherein said stem (14) at the tapered-down end of said wedge (13) has shoulders (35) on said respective parallel surfaces (15,16) thereof at the end of said parallel surfaces adjoining wedging surfaces (17, 18) of said wedge (13).

16. Anchoring bolt according to claim 1, wherein mixing teeth (12) are formed at an end surface (11) of said insertion portion of said bolt running at a right angle to the anchoring bolt axis for breaking up and mixing a mortar capsule in said bore (21).

* * * * *